(12) United States Patent
Jodorkovsky et al.

(10) Patent No.: US 7,145,304 B1
(45) Date of Patent: Dec. 5, 2006

(54) ROTATING STORAGE MEDIA CONTROL LOOPS HAVING ADAPTIVE FEED FORWARD INSERTION OF SIGNALS INCLUDING HARMONICS

(75) Inventors: Mario Jodorkovsky, Nesher (IL); Assaf Margalit, Nesher (IL); Yehonatan Mandel, Kiryat-Ata (IL)

(73) Assignee: Zoran Corporation, Sunnyvale, CA (US)

( * ) Notice: Subject to any disclaimer, the term of this patent is extended or adjusted under 35 U.S.C. 154(b) by 40 days.

(21) Appl. No.: 11/215,258

(22) Filed: Aug. 29, 2005

(51) Int. Cl.
G11B 7/004 (2006.01)

(52) U.S. Cl. .................. 318/561; 318/629; 360/77.04; 369/44.32; 369/53.14

(58) Field of Classification Search ............... 318/561, 318/609, 610, 619, 621, 629, 632; 360/75, 360/77.01, 77.03, 77.04; 369/43, 44.11, 369/44.32, 53.14
See application file for complete search history.

(56) References Cited

U.S. PATENT DOCUMENTS

| | | | |
|---|---|---|---|
| 4,300,226 A * | 11/1981 | Barnette et al. | 369/43 |
| 4,918,972 A * | 4/1990 | Kenny et al. | 73/1.79 |
| 5,646,797 A * | 7/1997 | Kadlec et al. | 360/75 |
| 6,493,175 B1 * | 12/2002 | Carlson | 360/78.04 |
| 6,590,843 B1 | 7/2003 | Zhuang | |
| 6,765,848 B1 | 7/2004 | Faucett | |
| 6,826,135 B1 | 11/2004 | Fukamachi | |
| 6,972,540 B1 * | 12/2005 | Wang et al. | 318/650 |
| 2002/0089906 A1 | 7/2002 | Faucett | |
| 2002/0097643 A1 | 7/2002 | Kadlec et al. | |
| 2002/0136113 A1 | 9/2002 | Kadlec et al. | |
| 2004/0156275 A1 | 8/2004 | Ishikawa et al. | |

OTHER PUBLICATIONS

Bodson, Marc et al., "Harmonic Generation in Adaptive Feedforward Cancellation Schemes", IEEE Transactions on Automatic Control, vol. 39, No. 9, Sep. 1994, pp. 1939-1944.
Sacks, Alexei H. et al., "Advanced Methods for Repeatable Runout Compensation", IEEE Transactions on Magnetics, vol. 31, No. 2, Mar. 1995, pp. 1031-1036.
Abramovitch, Daniel, "Magnetic and Optical Disk Control: Parallels and Contrasts", Agilent Laboratories, Mar. 6, 2001, 8 pages.

* cited by examiner

Primary Examiner—Bentsu Ro
(74) Attorney, Agent, or Firm—Parsons Hsue & de Runtz LLP

(57) ABSTRACT

An adaptive feed forward controller inserts signals into control loops of an optical disc player and/or recorder at a frequency of the rotation of the disc and one or more harmonics thereof, while at the same time maintaining the stability of the control loops. This makes the control loops more responsive to harmonic components of eccentric and/or tilt motion of a track being followed, a characteristic of poor quality optical discs. The quality of playback or recording such discs is thereby improved. Signal processing forming the control loops including the adaptive feed forward controller is carried out by a software controlled processor on an integrated circuit chip within the optical disc instrument. A signal representing the frequency of rotation of the disc, which is used in the signal processing, can be derived from the control loop rather than by directly measuring rotation with a transducer in the rotating system.

28 Claims, 4 Drawing Sheets

ROTATING STORAGE MEDIA CONTROL LOOPS HAVING ADAPTIVE FEED FORWARD INSERTION OF SIGNALS INCLUDING HARMONICS

BACKGROUND

This invention relates generally to following tracks of rotating storage media, such as optical discs, for the purpose of reading or writing data and, more specifically, to servo control loops of which a read head and/or components of a read head are a part, such as those read heads including a light source and photodetector, to follow signal tracks on the media. Removable optical disc applications include playing or recording compact discs (CDs) and digital versatile discs (DVDs) of various specific types.

In optical disc applications, a coherent beam of light is focused to a very small spot on the spinning disc and is caused to follow a spiral optical track. A disc player reads optically encoded data from the track or tracks. Light reflected from the disc, which has been modulated by the optical encoding, is directed onto a photodetector array. Electronic signals from the photodetector array are then processed to retrieve the data stored on the disc track. If in a recorder, the disc track does not yet contain data but is followed by the spot of laser light during recording. The laser light is modulated during recording by the data being stored, and in turn the modulated light is optically recorded on the track in the form of permanent or erasable marks.

An optical system including a laser light source and photodetector array is typically caused to follow the track by a mechanism and motive source that are part of at least one servo control loop. That is, a motive source causes the optics to follow the track and the output of the photodetector array includes a signal from which an error in position of the focused spot of light with respect to the track may be determined. When there is an error, the optics are then moved by operation of the servo control loop in a manner to eliminate the error. There are typically two such control loops used to maintain the focused spot of light on the track of a spinning disc, one that maintains its axial position with respect to the layer of the disc containing the track and the other the spot's radial position on the track.

There is nearly always some degree of radial eccentricity of the track that the radial tracking servo control loop must be able to follow, usually caused by an imprecision in the formation of the tracks on the disc or a lack of alignment of the center of the tracks with the center of the hole that fits onto the spindle of the machine. This repeatable runout can be a considerable source of tracking error. The amount of eccentricity is particularly high for discs that are not manufactured with precision but rather are mass produced at a very low cost. The optical head of a disc machine needs to follow these eccentricities if the data are to be accurately read or recorded. Imprecision of the machine's spindle mechanism may also be a cause of radial eccentricities of the track, which can change over time as bearings and the like wear from use.

A second imprecision that usually exists in following the track is axial eccentricity, where the track moves back and forth along the optical axis of the read head as the disc rotates. This most commonly is caused by the disc not being positioned flat on the spindle, so that it has some tilt with respect to the desired plane of rotation of the disc. It can also be caused by the disc itself being warped. A focus mechanism of the optical head, part of the typical second servo control loop, operates to maintain the spot focused on the track as the disc rotates.

Each of these disc eccentricity and tilt effects result in a periodic variation of track position that has a fundamental frequency equal to the speed of rotation of the disc. In addition to the fundamental frequency (first harmonic), there are usually components of motion at one or more higher harmonics. It is desirable that the tracking and focus servo control loops be able to follow the higher harmonics, as well as the fundamental frequency, so that the optics accurately follow the track while at the same time maintaining stability of the control loops. This can be accomplished by giving the control loop a high gain and a wide bandwidth that accepts all the harmonics but this results in a high degree of noise in the loop. An instability of the loop usually follows from this, however, which is not acceptable.

SUMMARY OF THE INVENTION

Briefly and generally, a signal is inserted by adaptive feed forward (AFF) controllers into each of tracking and focus servo control loops that contains the fundamental frequency of the speed of rotation of the disc and any higher order harmonics present in the loop error signal with dynamically determined magnitudes and phases. The result is that the complex motion of the track caused by the presence of two or more harmonics is accurately followed. In a preferred form, each AFF generates such a signal by combining the loop error signal with outputs of free running sinusoidal signal generators through multiplication and integration. The complex AFF output signal is generated by a single process, rather than by separately generating each of two or more harmonics and then combining them together. The frequency of rotation of the spindle is obtained from a signal in the control loop, such as the error signal, rather than requiring a separate transducer to measure the spindle rotation. The AFF sinusoidal signal generator is synchronized by this spindle rotation frequency signal to generate signals at the frequency of the spindle rotation. The electronic portions of the control loops and the AFFs are preferably implemented by a software controlled processor, such as a processor provided on a single integrated circuit chip that controls most operations of a playback and/or recording machine as well as processing the data being read from and/or written to an optical disc.

Additional aspects, advantages and features of the present invention are included in the following description of exemplary examples thereof, which description should be taken in conjunction with the accompanying drawings. All patents, patent applications, articles and other publications referenced herein are hereby incorporated herein by this reference in their entirety for all purposes.

DESCRIPTION OF EXEMPLARY EMBODIMENTS

The example implementations of the invention are described with respect to the playback or recording of rotating CDs or DVDs. There are several types of CDs, namely CD-ROMs, CD-R and CD-RW, and several types of DVDs, including DVD-ROMs (single and dual layer), DVD+R/-R (single and dual layer), DVD+RW/-RW and DVD-RAM. The invention can also, however, be used with other moving optical and non-optical storage media.

Figure 1:
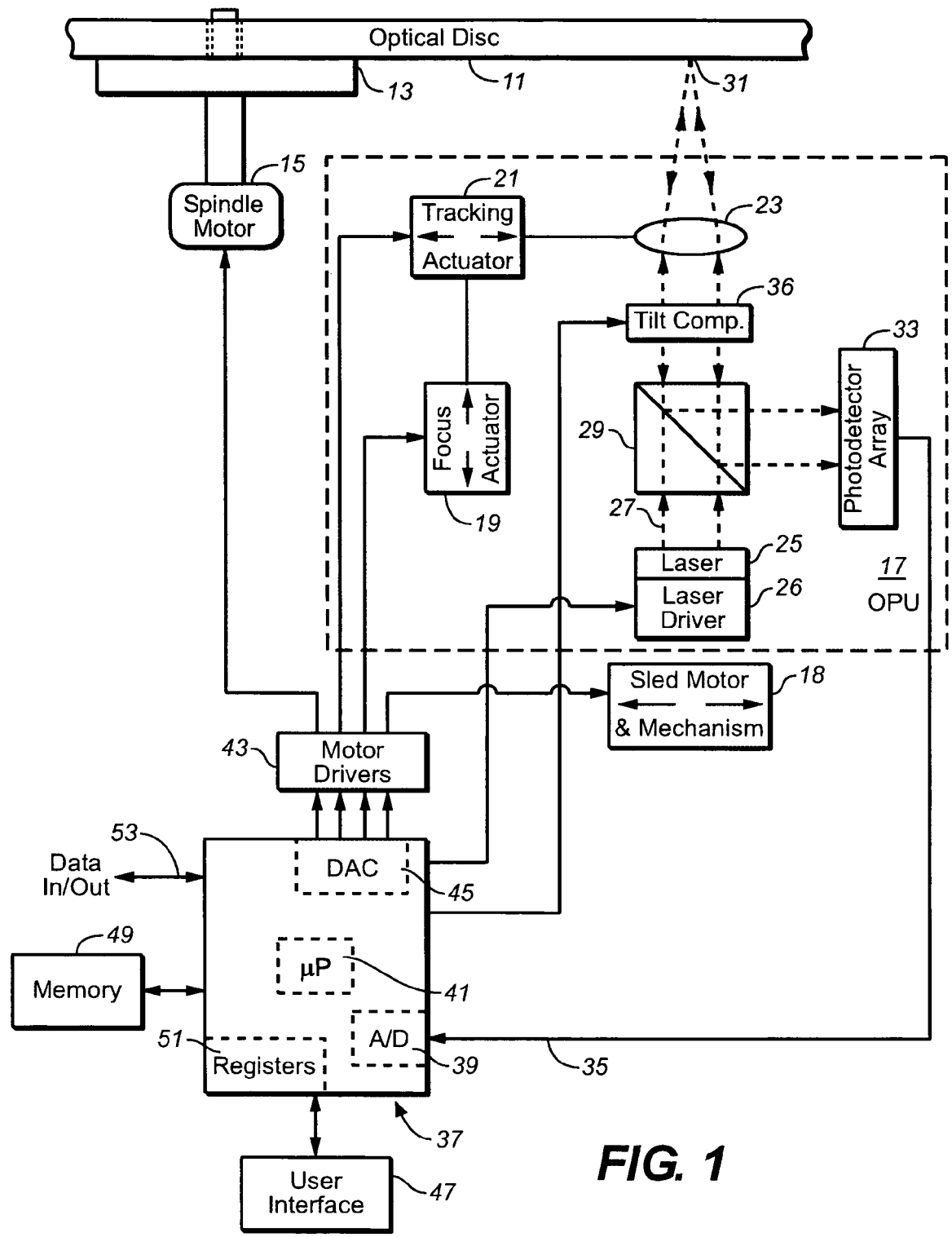
FIG. 1 shows controller and processing portions of an optical disc machine that plays and/or records data.

Referring to FIG. 1, a system is shown for a machine that either plays or records optical discs, or both. An optical disc 11 is removably carried by a spindle turntable 13. The spindle 13, and thus also the optical disc 11, are rotated by an electrical motor 15. An optical pick-up unit (OPU) 17 is carried by a sled mechanism (not shown) that allows the OPU to move in a radial path across the exposed portion of the disc. A motor 18 moves the OPU 17 back-and-forth in a radial path. Within the OPU 17 are electrical motors, actuators or other motive sources 19 and 21, having a limited mechanical displacement capability, that are attached to an optical element 23 to move it axially (toward and away from the disc 11) and radially (parallel with the disc 11), respectively. The goal of this movement is to follow the spiral track on the disc 11 while maintaining the optics focused on the data layer. Although only a single lens 23 is shown, the optical system can include multiple optical elements or a different type of element.

At least one laser diode 25 emits a monochromatic beam 27 of radiation in the visible or near-visible portion of the electromagnetic spectrum. Operation of the laser diode 25 is controlled by driving circuits 26. The beam 27 is passed through an appropriate optical system, represented in FIG. 1 by a beam splitter 29 and the objective lens 23 to a focal point (very small spot) 31. That radiation is reflected back from the disc 11 through the beam splitter onto an array of photodetectors 33. The photodetector array 33 may be one of many different available types but most commonly includes several independent photodetectors positioned in a manner to provide information of the location of the spot 31 with respect to the track it is following, as well as information of the data recorded on that track. The array outputs are carried by an electronic circuit 35 to control and signal processing circuits 37.

An optical tilt compensator 36 may optionally be placed between the beam splitter 29 and the objective lens 23, as shown in FIG. 1. Typically a liquid crystal device (LCD), the compensator 36 corrects optical aberrations in response to a control signal. Such compensation is usually included in machines that record discs but commonly not provided in machines that only play discs. As an alternative to use of the LCD 36, another motive source (not shown) may be included to tilt the OPU 17 with respect to the plane in which the removable disc 11 is expected to lay, in response to a control signal.

Since a data track within the disc 11 typically moves both radially and axially with respect to a stationary spot 31 while the disc is being rotated due to disc and/or turntable mechanical imperfections, suitable closed focus and tracking loops, implemented by the processing circuits 37, cause the motive sources 19 and 21 to move the lens 23 to minimize error signals produced by the circuits 37 from the output 35 of the photodetector array 33. The control and processing circuits 37 include analog-to-digital (A/D) circuits 39 that convert the analog output of the photodetector array 33 into digital signals that are then utilized by a microprocessor 41 and other portions of the processing circuits 37.

The machine of FIG. 1 also includes circuits 43 that drive the motors 15 and 18, and the actuators 19 and 21. The control and signal processing circuits 37 include digital-to-analog (DAC) converters 45 that provide analog signal outputs that control the motor drivers 43. These drivers apply power and/or controlling signals to each of the motive sources 18, 19 and 21 with values controlled by respective ones of three of the signal outputs of the DACs 45. These values control the manner in which the motive source 18 moves the OPU in a radial direction across the disc 11, and how the motive sources 19 and 21 independently move the lens 23 in two orthogonal directions (radially and axially, respectively) within the OPU 17.

Connected with the circuits 37 is a user interface 47 that includes buttons, switches and the like that the user manipulates to operate the machine, and indicators that provide the user with status information of the machine. Further, a digital memory 49 is also connected with the control and signal processing circuits 37. The memory 49 preferably includes both re-programmable non-volatile semiconductor memory, such as flash memory, and volatile dynamic random-access memory (DRAM). A set of temporary data storage registers 51 are also provided within the circuits 37. The control and signal processing circuits 37 are preferably implemented on a single integrated circuit chip, with the memory 49 provided by one or more additional chips. Together, these two chips control operation of the machine shown in FIG. 1.

As an alternative to the preferred single processing chip, separate components, with the same combined functionality, can be employed. In addition, a fixed function hardware controlled processing approach can be used, at the expense of reducing the implementation's ability to be adapted to a wide range of optical disc mechanism parameters.

In addition, if the signal processing circuits 37 are implemented in a single processing chip, it preferably performs all or nearly all the processing performed by the machine on data either being read from the disc 11 or written onto it, generally also with the use of some portion of the memory 49. A circuit 53 carries data from an external source to the machine (for recording) or from the machine to an external utilization device (for playback).

Figure 2A:
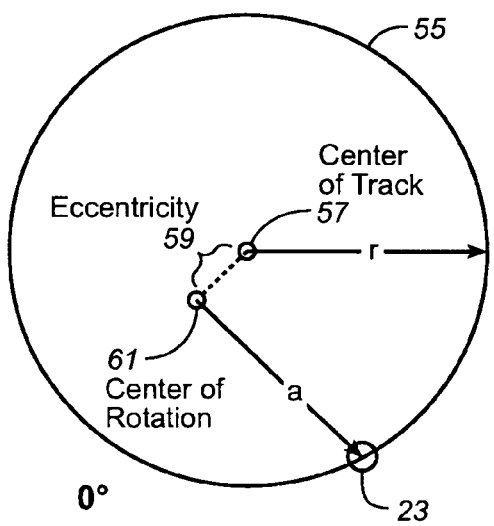
FIGS. 2A–2D illustrate effects in the machine of FIG. 1 of the eccentricity of a track on an optical disc, each showing geometric relationships of the disc and parts of the disc machine of FIG. 1 when the disc is in different relative rotational positions.
Figure 2B:
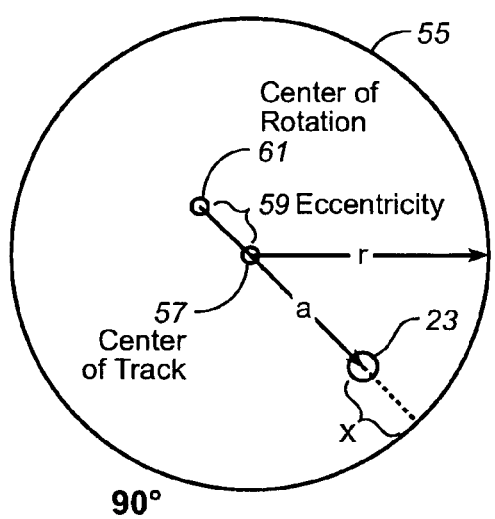
Figure 2C:
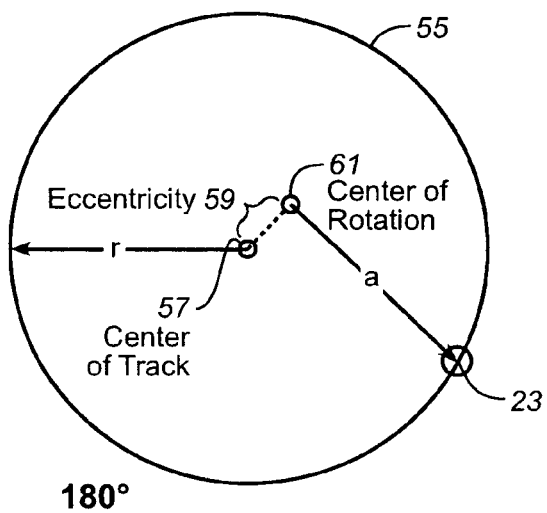
Figure 2D:
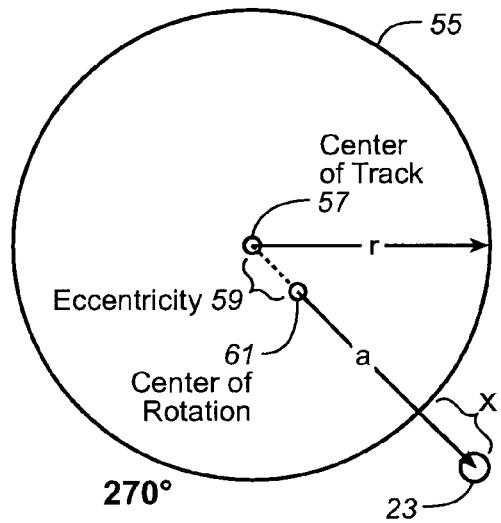

With reference to FIGS. 2A–2E, the eccentricity (also referenced as runout) that is commonly present in tracks of optical discs will be explained. The effect on a single circular track 55 is shown in FIGS. 2A–2D for four different rotational positions. A center 57 of the track 55 is displaced a distance 59 from a center of rotation 61 of the disc by the spindle 13 (FIG. 1). The circular track 55 has a radius "r"

from its center 57. The optics 23 of the OPU 17 (FIG. 1) are illustrated in FIGS. 2A–2D to be positioned a stationary distance "a" from the center of rotation 61 of the spindle 13. In FIG. 2A, the disc is shown in a starting rotational position, at zero reference degrees, with the optics 23 coincident with the track 55. But after the disc rotates 90 degrees clockwise, as shown in FIG. 2B, the optics 23 are no longer coincident with the track 55. Rather, the eccentricity 59 has caused the track to move outward of the stationary optics 23. After a further 90 degree rotation, the optics 23 are again aligned with the track 55, as shown in FIG. 2C. After yet another 90 degree rotation, as shown in FIG. 2D, the track 55 has moved inward of the optics 23. These figures illustrate the necessity to move the optics 23, so as to reposition the laser spot 31, rather than maintaining them stationary as shown here, in order to follow the eccentric motion of the track 55. This is accomplished by properly energizing the actuator 21 (FIG. 1).

Figure 2E:
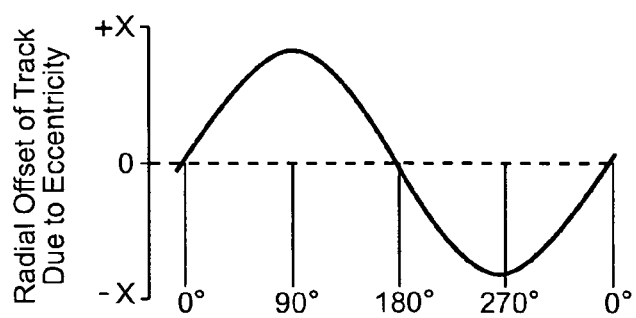
FIG. 2E illustrates an effect of the eccentricity of the disc of FIGS. 2A–2D when the disc is rotated.

FIG. 2E illustrates the offset "x" of the track 55 along a radius of rotation of the disc, with respect to the stationary optics 23, as a function of the disc rotational position. If the track 55 is a perfect circle and the disc is accurately rotated about a fixed center of rotation, the function of FIG. 2E is sinusoidal with a fundamental frequency equal to the rotational speed of the spindle 13 (FIG. 1). That is, if the spindle rotates at 100 revolutions per second, for example, the function of FIG. 2E has a frequency of 100 Hz. But the more usual case is that the track 55 is not a perfect circle about its center 57, and/or the spindle 13 does not rotate the disc with precision about a fixed center. So the function x shown in FIG. 2E is not then a pure sine wave as shown but rather a function that has a fundamental frequency equal to the speed of rotation of the spindle plus one or more additional harmonics due to these further imperfections in the radial direction.

Figure 3:
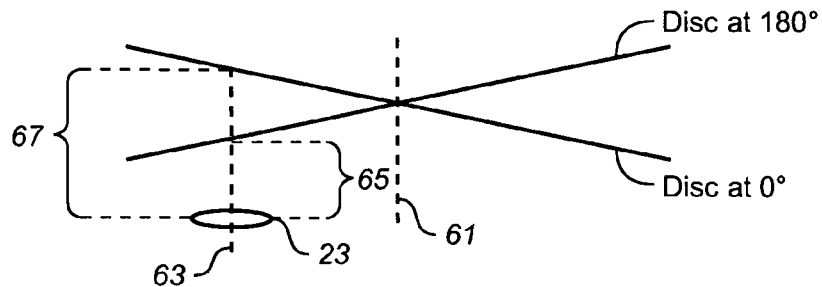
FIG. 3 illustrates an effect in the machine of FIG. 1 of a varying tilt of an optical disc on the machine's optical system.

FIG. 3 illustrates another imperfection in following a disc track, namely the variation of disc position along an optical axis 63 of the optics 23 (FIG. 1). This is due to the disc 11 being tilted when rotated, rather than perfectly perpendicular to its axis of rotation. The result, illustrated in FIG. 3, is that the optics 23 are a distance 65 from a layer of the disc being read when the disc is in one rotational position and another distance 67 after the disc has been rotated 180 degrees. Since it is important to maintain the optics focused on the track at all times, the optics 23 are then moved by the actuator 19 to cause their focal point 31 (FIG. 1) to follow the axial movement of the disc. This movement is also sinusoidal with a fundamental frequency equal to the speed of rotation of the spindle 11, plus one or more additional harmonics due to further imperfections in the rotation or the disc itself.

Figure 4:
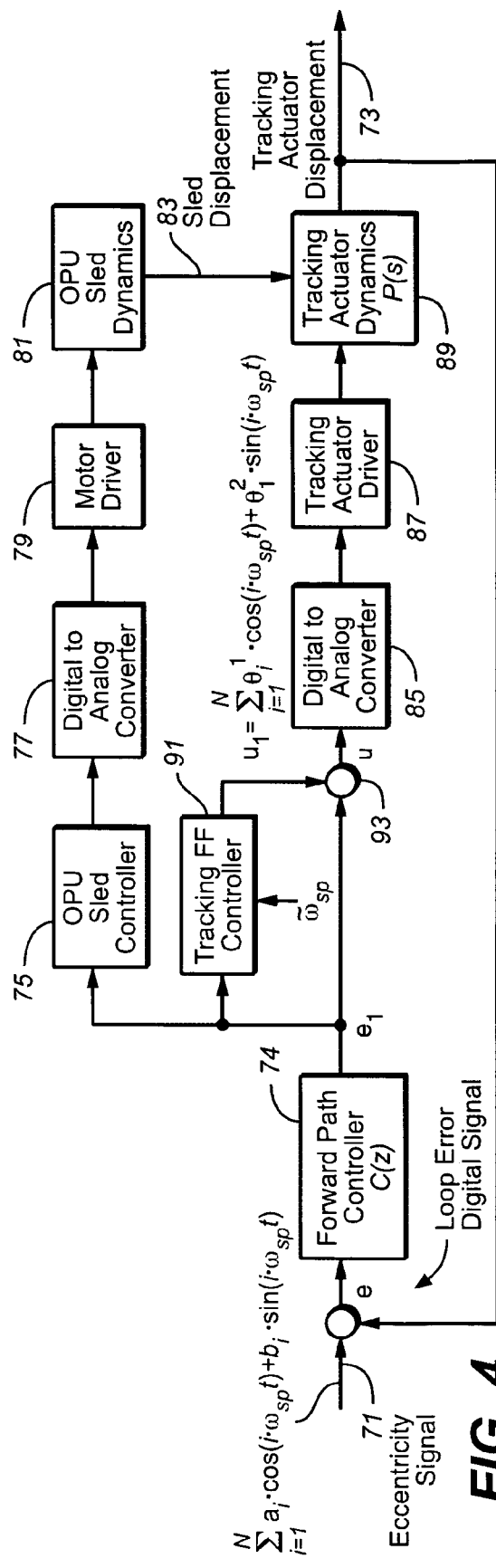
FIG. 4 is a block diagram of computational and mechanical components of a radial tracking servo control loop of the machine of FIG. 1.

An improved servo tracking loop is shown in FIG. 4. This loop causes the optics 23 to follow any radial eccentricities of a disc track having multiple harmonics of motion but at the same time operates with stability. An input 71 to the control loop is an eccentricity signal from the photodetector array 33 (FIG. 1), which is obtained by the signal processing circuits 37 converting the analog signals 35 into digital signals and then calculating the eccentricity signal from several outputs of the array. The eccentricity signal 71 can be mathematically represented as shown in FIG. 4, wherein $\omega_{sp}$ is the rotational speed of the spindle 13 (and thus of the disc 11) in radians per second, i refers to an individual harmonic from 1 (the fundamental) to N, and $a_i$ and $b_i$ are coefficients. Each harmonic can be described by the expression for the signal 71 provided in FIG. 4 with its own set of coefficients $a_i$ and $b_i$ (where i=1, 2 ... N). The sum of those expressions represents the totality of the eccentricity signal.

An output 73 of the servo control loop of FIG. 4 is mechanical movement of the optics 23 by the tracking actuator 21 (FIG. 1). The control loop causes the optics 23 to follow the track, with its eccentricities, in a manner that tends to minimize a digital error signal e of the loop. The error signal e is then subjected by signal processing within signal processing circuits 37 to a function C(z), indicated by a block 74, thereby to provide a modified error signal $e_1$ that is applied to two branches of the loop. One branch includes a controller 75 of a sled that moves the entire OPU 17 in a radial path across the spinning disc 11. The controller 75 is implemented within the signal processing circuits 37, an output of which is then converted to an analog signal, as indicated by block 77, by use of the DAC 45 within the signal processing circuits 37. This analog signal is then applied to a motor driver, as indicated by a block 79, which is the one of the motor drivers 43 that drives the sled motor 18. The sled mechanism and motor, having an electromechanical response function 81, then moves as indicated at 83. Such movement causes the entire OPU 17 to move, including the optics 23 and its tracking actuator 21. This provides coarse motion of the optics 23 to follow the optical disc track.

The second branch of the servo control loop of FIG. 4 provides a fine adjustment of the position of the optics 23 with respect to the disc track being followed. A digital signal u, a combination of the error signal $e_1$ and generated signal $u_1$, is converted to an analog signal by the DAC 45 of the signal processing circuits 37, indicated by a block 85, and then used to drive the tracking actuator 21 through its driver within the motor drivers 43, as indicated by a block 87. The electromechanical response of the actuator 21 and optics 23 to this signal is indicated by the block 89. The total movement of the optics 23 radially across the rotating disc 11, indicated at 73, is a combination of the sled displacement by the motor 18 and the optics movement by the actuator 21.

The control loop of FIG. 4 also includes an adaptive feed forward (AFF) controller 91, executed by the processing signal processing circuits 37, that also receives the error signal $e_1$ and generates the signal $u_1$ that is then combined at 93 with the signal $e_1$ to provide the error signal u that is then used in the rest of the tracking loop 85, 87 and 89 in the manner described above. A mathematical representation of the output $u_1$ of the AFF controller 91 is given in FIG. 4, wherein those terms that are the same as those of the eccentricity signal 71 have the same meaning, and $\theta_i^1$ and $\theta_i^2$ are coefficients 1 and 2 calculated for each of the harmonics i by the AFF controller 91. The spindle rotation frequency $\omega_{sp}$ can be obtained from a suitable transducer that directly measures that rotation but it is possible to derive this information from the control loop itself, in the manner described below with respect to FIG. 9.

The purpose of the AFF controller 91 is to provide a high gain in the loop at each of the first through N harmonics present in the eccentricity signal 71. By using a single AFF controller, the stability of the closed loop is not severely affected. The harmonics generated by the AFF controller 91, combined in a single signal $u_1$, will reduce some of those harmonics in the error signal $e_1$. Since the error signal $e_1$ is also applied to the sled loop 75, 77, 79 and 81, its low values at the harmonics of the eccentricity signal results in the sled not responding to them, which is desirable. The purpose of the sled is to coarsely position the focal spot 31 of the OPU 17 close to the desired track, while the optics 23 are moved by the actuator 21 to cause the spot 31 to follow the desired track, including the high frequency movements resulting from the eccentricity of the track. Examples of the AFF controller 91 are described below with respect to FIGS. 6 and 7.

Figure 5:
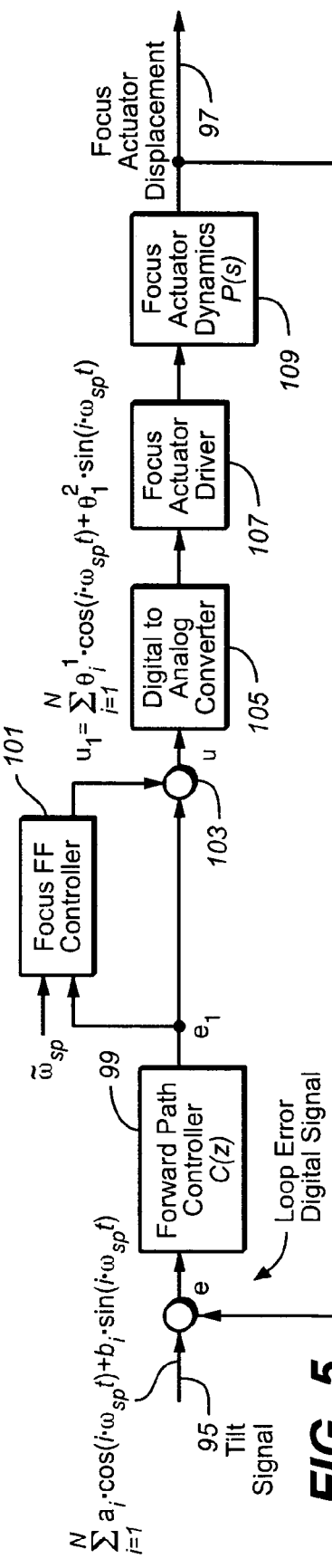
FIG. 5 is a block diagram of computational and mechanical components of a an axial focusing servo control loop of the machine of FIG. 1.

A focus servo control loop is shown in FIG. 5. A tilt signal 95 is obtained by processing, within the signal processing circuits 37, the several signals in the output 35 of the photodetector array 33. The tilt signal has a value and sign that are proportional to the degree and direction of any lack of focus of the spot 31 on the layer of the disc 11 that contains the track being followed. In effect, the tilt signal 95 provides information of whether the focal point 31 falls in front of or behind that layer. This represents an error in the focus due to the cyclic tilting of the optical disc (see FIG. 3) at frequencies of the spindle rotation and its higher harmonics. The mathematical description of the tilt signal 95 shown in FIG. 5 is the same as that for the eccentricity signal 71 of FIG. 4 but, of course, the coefficients $a_i$ and $b_i$ of the various single frequency terms of the two series are independent of each other.

An output 97 of the focus control loop of FIG. 5 is axial movement of the lens 23 by the focus actuator 19. This movement is made to minimize the error signal e. The focus control loop of FIG. 5 is similar in function to the tracking loop if FIG. 4. The error signal e is processed within signal processing circuits 37 by a function C(z), as indicated by a block 99, in order to provide a modified error signal $e_1$. A focus AFF controller 101 generates a signal $u_1$ that has the same mathematical form as the signal $u_1$ of the tracking loop of FIG. 4. The resulting components of the single signal $u_1$ having frequencies of the spindle velocity and higher harmonics are then combined at 103 with the error signal $e_1$. The resulting digital error signal u is thereafter converted to an analog signal by the DAC 45 of the signal processing circuits 37, indicated by a block 105, and then used to drive the focus actuator 19 through its driver within the motor drivers 43, as indicated by a block 107. The electromechanical response of the focus actuator 19 and optics 23 to this signal is indicated by a block 109.

Figure 6:
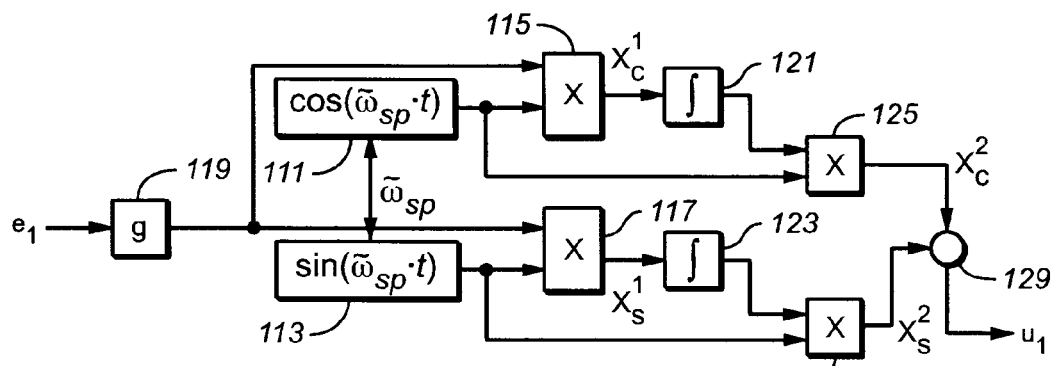
FIG. 6 conceptually illustrates the computation carried out by the feed forward (FF) controllers of the control loops of FIGS. 4 and 5.

A simplified form of the processing for the AFF controllers 91 and 101 that is performed by the integrated circuit signal processing circuits 37 is illustrated in FIG. 6. The processing is the same in both of the tracking and focus loop AFF controllers but the values are of course different. A cosine generator 111 and sine generator 113 provide signals at a frequency $\omega_{sp}$ that are 90 degrees out of phase with each other. These signals are multiplied at 115 and 117, respectively, by the error signal $e_1$ after adjustment at by an amplitude factor g. This multiplication provides outputs $x_c^1$ and $x_s^1$ that each contains the second harmonic of the frequency $\omega_{sp}$. The quantities $x_c^1$ and $x_s^1$ are then independently integrated, at 121 and 123, respectively, in order convert differentials of coefficients in $x_c^1$ and $x_s^1$ into the coefficients. The results of this integration are then multiplied by the cosine and sine generator outputs, at 125 and 127, in order to generate the first and third harmonics in respective quantities $x_c^2$ and $x_s^2$. These quantities are added at 129 to provide the signal $u_1$ that is used in the servo control loops of FIGS. 4 and 5. If the error signal $e_1$ contains additional harmonics, first, second and third harmonics of these additional harmonics will also be generated by the AFF controller. Use of both sine and cosine generators and their two respective processing paths results a single signal containing the harmonics of the eccentricity or tilt signal input to the control loop, and in the relative magnitudes of that loop. The amplitude and phase of the resulting signal $u_1$ are automatically adjusted as the error signal $e_1$ changes.

Figure 7:
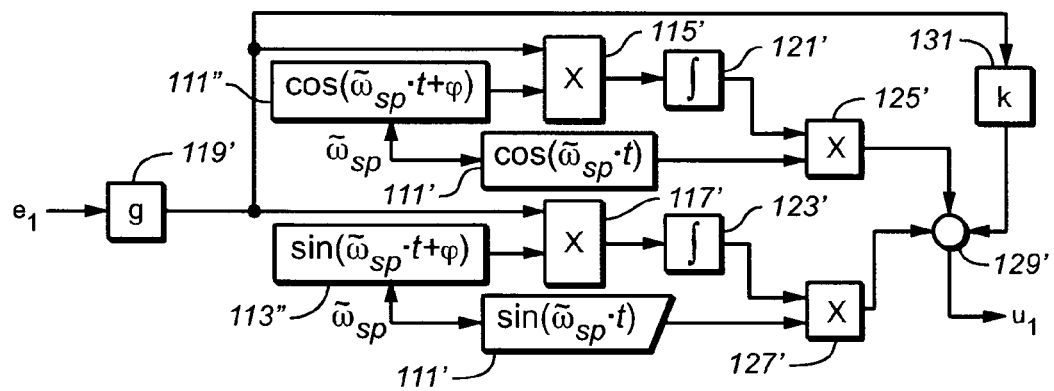
FIG. 7 illustrates more completely the computation carried out by the feed forward (FF) controllers of the control loops of FIGS. 4 and 5.

A more complete AFF controller is shown in FIG. 7, wherein processing functions that correspond to those of FIG. 6 are given the same reference numbers but with a prime (') added. One difference is that the cosine generator 111 (FIG. 6) provides two outputs 111' and 111" that have a phase difference Ø between them that is set upon calibration of the machine. Similarly, two sine wave outputs 113' and 113" differ in relative phase by Ø. Also, the error signal $e_1$, after being adjusted in magnitude by a factor g at 119', is added to the outputs of the multipliers 125' and 127' after being further adjusted at 131 by a factor k. Additional details and bases of operation of certain aspects of the AFF controller described with respect to FIGS. 6 and 7 may be obtained by reference to the following technical papers:

Bodson et al., "Harmonic Generation in Adaptive Feedforward Cancellation Schemes," *IEEE Transactions on Automatic Control*, vol. 39, no. 9, pp. 1939–1944, September, 1994; and Sacks et al., "Advanced Methods for Repeatable Runout Compensation," *IEEE Transactions on Magnetics*, vol. 31, no. 2, pp. 1031–1036, March 1995.

Use of the control loops of FIGS. 4–7 improve the performance of an optical disc player and/or recorder in which they are utilized, especially with poor quality discs. If a disc has a defective area such that the track cannot be read for a time, the resulting loss of the eccentricity and tilt signals does not stop operation of the control loops. The sine and cosine generators of the AFF controllers 91 and 101 continue to operate with the same amplitude and phase when the error signal $e_1$ becomes zero. This feature also makes it quicker to jump the focal spot 31 from one track on the disc to another, or from one layer to another on multi-layer discs. The generation of a single AFF controller signal $u_1$ for each of the control loops retains the stability of operation of the loop. An alternate way of generating several harmonics that uses a parallel connection of separate AFF controllers, one for each of the harmonics, is complicated and is difficult to implement without sacrificing the operational stability of the control loop.

Figure 8:
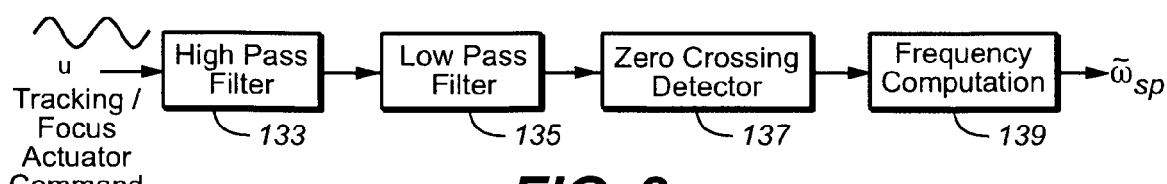
FIG. 8 shows one way to derive a signal having a frequency of the rotation of the machine spindle, for use in the computation of FIGS. 6 and 7.

The AFF controllers of FIGS. 6 and 7 utilize free running sine and cosine generators that have their output frequencies controlled by an estimate of the spindle rotation speed $\omega_{sp}$ that is an input to these signal generators. The estimate of $\omega_{sp}$ may be calculated in any of a number of ways such as from one of several signals in a control loop since many of these signals contain a component of the spindle frequency. One such technique is illustrated in FIG. 8. The error signal u from either one of the control loops of FIGS. 6 and 7 is passed through high and low pass filters 133 and 135. Zero crossings of the filtered signal are then detected at 137. An estimate of the spindle frequency is then calculated at 139 from knowledge of the time between zero crossings. This technique then makes it unnecessary to directly measure the rotation speed of the spindle 13, such as has been done in the past by attaching a transducer to the spindle or taking a measurement from the spindle drive motor 15. Alternatively, another of many existing algorithms may be used to estimate $\omega_{sp}$ from the error signal u.

Although the various aspects of the present invention have been described with respect to exemplary embodiments thereof, it will be understood that the present invention is entitled to protection within the full scope of the appended claims.

The invention claimed is:

1. A method of following movement of a track of a rotating data storage medium by a servo control loop that responds to a position error signal, wherein the error signal includes components resulting from movement of the track and having a frequency related to a speed of rotation of the storage medium and at least one harmonic of that frequency, comprising:

deriving a signal related to the speed of rotation of the storage medium from a signal in the servo control loop, in response to the derived rotation speed signal, generating at least one sinusoidal signal having a frequency related to the speed of rotation of the storage medium, combining the error signal and said at least one generated sinusoidal signal in a manner to generate a combined signal including the frequency related to the derived rotation speed signal and at least one harmonic of that frequency, and inserting the combined signal into the servo control loop.

2. The method of claim 1, wherein combining the error signal and said at least one generated sinusoidal signal includes multiplying these two signals together.

3. The method of claim 2, further comprising:

generating an integrated signal by integrating the combined signal, and multiplying the integrated signal by the generated at least one sinusoidal signal.

4. The method of claim 1, wherein generating at least one sinusoidal signal includes generating first and second sinusoidal signals with a common frequency related to the speed of rotation of the storage medium and relative phases shifted ninety degrees from each other.

5. The method of claim 4, wherein combining the error signal and said at least one generated sinusoidal signal includes multiplying each of the first and second sinusoidal signals with the error signal to produce respective first and second product signals.

6. The method of claim 5, additionally comprising:

integrating each of the first and second product signals to produce respective first and second integrated signals, multiplying the first integrated signal by the first sinusoidal signal and multiplying the second integrated signal by the second sinusoidal signal, thereby to produce respective first and second multiplied signals, and wherein the first and second multiplied signals are combined to produce the combined signal.

7. The method of claim 1, wherein deriving a signal related to the speed of rotation of the storage medium includes deriving the rotation speed signal from the error signal.

8. The method of claim 7, wherein deriving the rotation speed signal includes:

filtering the error signal, detecting zero crossings of the filtered error signal, and calculating a frequency of the error signal from the zero crossings.

9. The method of claim 1, wherein the movement of the track that is being followed includes a radial eccentricity.

10. The method of claim 1, wherein the movement of the track that is being followed includes an axial tilt.

11. The method of claim 1, wherein the movement of the track that is being followed includes both a radial eccentricity and axial tilt.

12. A method of following movement of an object subjected to repetitive motion, wherein movement of the object is followed by use of a servo control loop that responds to an error signal related to the position of the object, comprising:

deriving a signal related to movement of the object from a signal in the servo control loop, in response to the derived object movement signal, generating at least one harmonic signal having at least a frequency related to the repetitive motion of the object, combining the error signal and said at least one generated harmonic signal, and inserting the combined signal into the servo control loop.

13. A machine that plays and/or records a removable optical disc, comprising:

a spindle for rotating the optical disc, a photodetector device, an optical system that images a track of the rotating optical disc onto the photodetector device, a first motive device responsive to a first control signal to move at least a portion of the optical system axially with respect to the rotating spindle, a first control loop responsive to signals from the photodetector device and a focus error signal for generating the first control signal to maintain a disc track focused on the photodetector, the first control loop having a first adaptive feed forward controller with inputs of the focus error signal and the rotational speed of the spindle and an output inserting a signal into the first control loop, a second motive device responsive to a second control signal to move at least a portion of the optical system radially with respect to the rotating spindle, and a second control loop responsive to signals from the photodetector device and a tracking error signal for generating the second control signal to maintain a disc track radially aligned on the photodetector, the second control loop having a second adaptive feed forward controller with inputs of the tracking error signal and the rotational speed of the spindle and an output inserting a signal into the second control loop, wherein each of the first and second feed forward controllers includes:

at least one generator of at least one sinusoidal signal that is responsive to the rotational speed of the spindle, and at least one multiplier of the error signal and said at least one generated sinusoidal signal to produce at least one product, wherein the product includes a frequency related to the speed of rotation of the spindle and at least one harmonic thereof, whereby the outputs of first and second feed forward controllers are derived from this product.

14. The machine of claim 13, wherein the frequency related to the speed of rotation of the spindle utilized by the first control loop is derived from the focus error signal or the tracking error signal.

15. The machine of claim 13, wherein each of the first and second feed forward controllers additionally include:

an integrator of said at least one product, a second multiplier of the output of the integrator and the error signal to produce a at least a second product, and a combiner of the product outputs of said at least one multiplier and said second multiplier, wherein the output of the feed forward controller is derived from this combiner.

16. The machine of claim 15, wherein the frequency related to the speed of rotation of the spindle utilized by the first control loop is derived from the focus error signal or the tracking error signal.

17. The machine of claim 13, wherein each of the first and second feed forward controllers additionally include:

free running sine and cosine generators of sinusoidal signals that individually have a frequency following the speed of rotation of the spindle, first and second multipliers of the signal outputs of the respective sine and cosine generators with the error signal, first and second integrators of signal outputs of the respective first and second multipliers, third and fourth multipliers of signal outputs of the respective first and second integrators with the signal outputs of the respective sine and cosine generators, and a combiner of the outputs of the third and fourth multipliers, wherein the output of the feed forward controller is derived from this combiner.

18. The machine of claim 17, wherein the frequency related to the speed of rotation of the spindle utilized by the first control loop is derived from the focus error signal or the tracking error signal.

19. The machine of claim 13, wherein the frequency related to the speed of rotation of the spindle utilized by the first control loop and the frequency related to the speed of rotation of the spindle utilized by the second control loop are obtained without use of a transducer monitoring rotation of the spindle.

20. In an integrated circuit chip adapted for use in an optical disc machine and having an input circuit for receiving a signal from a photodetector device, at least first and second output circuits adapted to provide driving signals to move an optical system in two different directions, and a processor establishing first and second control loops between the input and respective first and second output circuits, an improvement wherein a signal is inserted into each of the first and second control loops that is derived from a combination an error signal of the loop and an output of at least one free running sinusoidal signal generator having a frequency controlled by a result of a calculation by the processor of a frequency of the error signal of the loop, thereby to include at least one harmonic of the output of the sinusoidal generator in the inserted signal.

21. The improved integrated circuit chip of claim 20, wherein the signal inserted into each of the first and second control loops is derived from a first mathematical product of the error signal of the loop and an output of said at least one sinusoidal signal generator, an integration of the first mathematical product, followed by a second mathematical product of the error signal and the integration of the first product, thereby to include multiple harmonics of the output of the sinusoidal generator in the inserted signal.

22. The improved integrated circuit chip of claim 20, wherein said at least one sinusoidal signal generator includes free running sine and cosine signal generators, the outputs of which are multiplied by the error signal of the loop and these products further processed before being combined to provide the inserted signal.

23. The improved integrated circuit chip of claim 22, wherein the further processing of the products includes their integration and a multiplication of the integrated product by the signal generator outputs.

24. The improved integrated circuit chip of claim 20, wherein the processor operates to calculate the frequency of the error signal of the loop includes:

filtering the error signal, detecting zero crossings of the filtered error signal, and calculating a frequency of the error signal from the zero crossings.

25. The improved integrated circuit chip of any one of claims 20–24, installed within an optical disk system having a spindle for rotating an optical disc, a photodetector with an output connected with the input circuit of the chip, an optical system directing light from a rotating disc onto the photodetector, and first and second motive sources connected respectively to the first and second output circuits of the chip for moving the optical system in two different directions that tend to minimize the loop error signals.

26. In a machine for playing and/or recording an optical disk having at least one circular optical signal track thereon, that has:

a spindle that removably holds the optical disk, a first motor that rotates the spindle at a controlled speed, an optical pick-up unit having a photodetector device and which is radially movable across the optical disk, a second motor that drives the optical pick-up unit radially across the optical disk, a tracking actuator within the optical pick-up unit that positions an image of a track of the optical disk onto the photodetector, a focus actuator within the optical pick-up unit that focuses an image of a track of the optical disk onto the photodetector, a first control loop based upon signals from the photodetector device and radial position errors relative to the tract that drives the second motor and the tracking actuator in order to minimize the radial position errors, a second control loop based upon signals from the photodetector device and focus position errors relative to the tract that drives the focus actuator in order to minimize the focus position errors, a first feed forward controller, including:

free running sine and cosine signal generators having frequencies related the speed of rotation of the spindle, first and second multipliers of the signal outputs of the respective sine and cosine generators with the error signal, first and second integrators of signal outputs of the respective first and second multipliers, third and fourth multipliers of signal outputs of the respective first and second integrators with the signal outputs of the respective sine and cosine generators, a combiner of the outputs of the third and fourth multipliers, and an inserter of the combined outputs into a portion of the first control loop driving the tracking actuator but not in a portion of the first control loop driving the second motor, wherein the tracking actuator operates to follow the eccentricity of the track without moving the optical pick-up unit to do so, and a second feed forward controller, including:

free running sine and cosine generators of sinusoidal signals with a frequency following the speed of rotation of the spindle, first and second multipliers of the signal outputs of the respective sine and cosine generators with the error signal,
first and second integrators of signal outputs of the respective first and second multipliers,
third and fourth multipliers of signal outputs of the respective first and second integrators with the signal outputs of the respective sine and cosine generators,
a combiner of the outputs of the third and fourth multipliers, and
an inserter of the combined outputs into the second control loop driving the focus actuator.

27. The machine of claim 26, wherein the individual sine and cosine generators receives a signal related to the speed of rotation of the spindle that is derived from a signal in one of the first and second control loops to which the feed forward controller of which it is a part is connected.

28. The machine of claim 27, wherein the signal derived from a signal in the first and second control loops is connected to be derived from the error signal of one of the loops.

\* \* \* \* \*